United States Patent [19]

Inoue et al.

[11] Patent Number: 5,684,122
[45] Date of Patent: Nov. 4, 1997

[54] COMPOSITE MATERIAL AND PROCESS FOR PRODUCTION THEREOF

[75] Inventors: Hiroshi Inoue; Toru Doi, both of Mie, Japan

[73] Assignee: Tosoh Corporation, Japan

[21] Appl. No.: 628,858

[22] Filed: Apr. 5, 1996

[30] Foreign Application Priority Data

Apr. 12, 1995 [JP] Japan .................................. 7-086887

[51] Int. Cl.[6] .......................... C08G 63/00; C08K 3/34; C08L 77/00
[52] U.S. Cl. .......................... 528/363; 528/392; 524/444; 524/445; 524/447; 524/456; 524/504; 524/505; 524/508; 524/514; 524/538; 428/331; 428/402; 428/411.1
[58] Field of Search ..................... 524/600, 606, 524/444, 445, 447, 456, 504, 505, 508, 514, 538; 528/392, 363; 428/411.1, 331, 402

[56] References Cited

U.S. PATENT DOCUMENTS 5,164,440  11/1992  Deguchi et al. .................. 524/444
5,244,729   9/1993  Harrison et al. .................. 428/331

Primary Examiner—Jeffrey C. Mullis
Assistant Examiner—P. Hampton-Hightower
Attorney, Agent, or Firm—Nixon & Vanderhye

[57] ABSTRACT

A transparent N-alkyl-substituted maleimide/olefin copolymer composite material is provided which comprises 100 parts by weight of an N-alkyl-substituted maleimide/olefin copolymer, and 0.1 to 100 parts by weight of phyllosilicate, the phyllosilicate being dispersed uniformly and finely in a matrix of the N-alkyl-substituted maleimide/olefin copolymer. A process for producing the N-alkyl-substituted maleimide/olefin copolymer composite material is also provided. The N-alkyl-substituted maleimide/olefin copolymer composite material is excellent in transparency, heat resistance, rigidity, and dimensional stability.

4 Claims, No Drawings

COMPOSITE MATERIAL AND PROCESS FOR PRODUCTION THEREOF

BACKGROUND OF THE INVENTION

1. Field of the Invention

The present invention relates to an N-alkyl-substituted maleimide/olefin type composite material, and a process for production thereof. More specifically, the present invention relates to an N-alkyl-substituted maleimide/olefin copolymer type composite material which contains fine phyllosilicate dispersed uniformly in the matrix of the copolymer.

The composite material produced according to the present invention has excellent transparency, and is superior to a simple N-alkyl-substituted maleimide/olefin copolymer in heat resistance, and rigidity. Therefore, this composite material is promising in various applications, not only to optical parts but also to automobile parts, electric parts, electronic parts, and so forth.

2. Description of the Related Art

In recent years, use of transparent plastic materials is actively investigated for optical parts such as optical lenses, and optical fibers, automobile parts such as headlights, and sunroofs in view of productivity improvement and weight reduction. For the uses, the requirements for the properties of the transparent plastic materials are becoming severer increasingly. In particular, requirements for heat resistance, and rigidity exemplified by flexural modulus have become extremely severe.

Copolymers having succinimide units are investigated comprehensively for the aforementioned uses because of the high heat resistance of the succinimide copolymer. For example, copolymerization of methyl methacrylate and N-aryl-substituted maleimide is disclosed in Japanese Patent Publication (Examined) 43-9753; and Japanese Patent Laid-Open Publications 61-141715, 61-171708, and 62-109811. Incorporation of N-aryl-substituted maleimide units into a styrene resin is disclosed in Japanese Patent Laid-Open Publications 47-6891, 61-76512, and 61-276807. Although the resins obtained by such a method is improved in heat resistance, the resin becomes more brittle, less processablity, and more discolored with the increase of the N-aryl-substituted maleimide content, disadvantageously.

On the other hand, N-alkyl-substituted maleimide/olefin copolymers are disclosed in Japanese Patent Laid-Open Publications 4-31407, 6-220106, and 7-138319. These copolymers are attracting attention as transparent polymer materials not having the aforementioned disadvantages. However, these material are still insufficient in heat resistance and rigidity for some application fields.

SUMMARY OF THE INVENTION

An object of the present invention is to provide a transparent composite material comprising an N-alkyl-substituted maleimide/olefin copolymer and phyllosilicate, being improved in heat resistance, rigidity, and dimension stability without impairing the transparency.

Another object of the present invention is to provide a process for producing the transparent composite material comprising an N-alkyl-substituted maleimide/olefin copolymer and phyllosilicate.

The transparent N-alkyl-substituted maleimide/olefin copolymer composite material of the present invention comprises 100 parts by weight of an N-alkyl-substituted maleimide/olefin copolymer, and 0.1 to 100 parts by weight of phyllosilicate, the N-alkyl-substituted maleimide/olefin copolymer comprising a first component (I) constituting from 40 to 60 mole % of the copolymer:

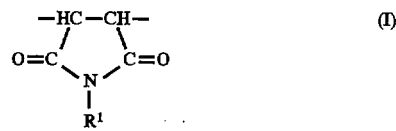

where $R^1$ is an alkyl group of 1 to 18 carbons or a cycloalkyl group of 3 to 12 carbons;
and a second component (II) constituting 60 to 40 mole % of the copolymer:

where $R^2$ is hydrogen or an alkyl group of 1 to 8 carbons, and $R^3$ and $R^4$ are independently an alkyl group of 1 to 8 carbons; and optionally a third component (III):

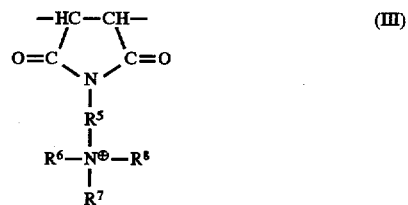

where $R^5$ is an alkylene group of 1 to 18 carbons, and $R^6$, $R^7$, and $R^8$ are independently hydrogen, or an alkyl group of 1 to 8 carbons;

the copolymer having a weight-average molecular weight ranging from $1\times10^3$ to $5\times10^6$; and the phyllosilicate being dispersed uniformly and finely in a matrix of the N-alkyl-substituted maleimide/olefin copolymer.

The process of the present invention produces the above transparent N-alkyl-substituted maleimide/olefin copolymer composite material, and comprises at least steps of (A), (B), and (C):

(A) a step of reacting a copolymer constituted or 40 to 60 mole % of maleic anhydride and 60 to 40 mole % of an olefin with one or more amine compounds to form a polyamidic acid in a solvent for the resulting polyamidic acid to form a homogeneous solution, (B) a step of contacting the formed homogenous polyamide solution with a suspension of phyllosilicate, and (C) a step of heating the mixture of the polyamidic acid and the phyllosilicate prepared in Step (B) above to cause ring closure of the polyamidic acid to form an imide in the presence of the phyllosilicate, thereby forming a copolymer containing succinimide units of Component (I), or of Component (I) and Component (III) to obtain a composite material containing to phyllosilicate.

DETAILED DESCRIPTION OF THE PREFERRED EMBODIMENT

The N-alkyl-substituted maleimide/olefin copolymer composite material of a first embodiment of the present invention is characterized by phyllosilicate dispersed uniformly and finely in the matrix or the N-alkyl-substituted maleimide/olefin copolymer. The language "phyllosilicate dispersed uniformly and finely" herein means that the phyllosilicate is dispersed such that the dispersed phyllosilicate does not impair the transparency of the composite material, specifically the phyllosilicate having average particle diameter of not larger than 0.3 μm, preferably not larger than 0.1 μm.

The N-alkyl-substituted maleimide/olefin copolymer composite material of a second embodiment of the present invention is characterized by the phyllosilicate dispersed uniformly and finely in the matrix of the N-alkyl-substituted maleimide/olefin copolymer, and bonded to the copolymer by ionic bonding. The language "phyllosilicate dispersed uniformly and finely" herein means the same as above.

The transparency which is the characteristic of the composite material of the present invention means a total light transmittance of not lower than 70%, and haze of not higher than 10% with a test piece of 1 mm thick according to ASTM D1003.

The N-alkyl-substituted maleimide/olefin copolymer employed in the present invention comprises a first component (I) constituting from 40 to 60 mole % of the copolymer, a second component (II) constituting from 60 to 40 mole % of the copolymer, and may further comprises optionally a third component (III) shown by the formulas below:

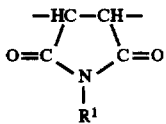

where $R^1$ is an alkyl group of 1 to 18 carbons or a cycloalkyl group of 3 to 12 carbons;

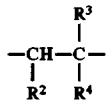

where $R^2$ is hydrogen or an alkyl group of 1 to 8 carbons, and $R^3$ and $R^4$ are independently an alkyl group of 1 to 8 carbons; and

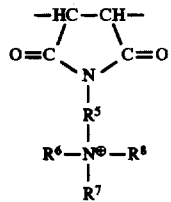

where $R^5$ is an alkylene group of 1 to 18 carbons, and $R^4$, $R^7$, and $R^8$ are independently hydrogen, or an alkyl group of 1 to 8.

The compound which gives Component (I) includes N-alkyl-substituted maleimides such as N-methylmaleimide, N-ethylmaleimide, N-n-propylmaleimide, N-isopropylmaleimide, N-n-butylmaleimide, N-isobutylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-stearylmaleimide, N-cyclpropylmaleimide, N-cyclobutylmaleimide, and N-cyclohexylmaleimide. Of these compounds preferred are N-methylmaleimide, N-ethylmaleimide, N-ispropylmaleimide, and N cyclohexylmaleimide. These compounds may be used singly or in combination of two or more thereof.

The compound which gives Component (II) includes olefins such as isobutene, 2-methyl-1-butene, 2-methy-1-pentene, 2-methyl-1-hexene, 1-methyl-1-heptene, 1-isooctene, 2-methyl-1-octene, 2-ethyl-1-pentene, 2-methy-2-butene, 2-methy-2-pentene, and 2-methy-2-hexene. Of these olefins, isobutene is particularly preferred. The olefins may be used singly or in combination of two or more thereof.

The compound which gives Component (III) can be prepared by reacting maleic anhydride and a diamine to form an addition compound, causing dehydration condensation and imide-cyclization to form a maleimide derivative, and converting it to a quaternary ammonium salt. The diamine employed therefor includes alkylenediamines such as ethylenediamine, 1,3-propylenediamine, 1,4-tetramethylenediamine, and 1,6-hexamethylenediamine; N,N-dialkylethylenediamines such as N,N-dimethylethylenediamine, N,N-diethylethylenediamine, and N,N-dipropylethylenediamine; N-diakyl-1,3-propylenediamines such as N,N-dimethyl-1,3-propylenediamine, N,N-diethyl-1,3-propylenediamine, and N,N-dipropyl-1,3-propylenediamine; N,N-dialkyl-1,4-tetramethylenediamines such as N,N-dimethyl-1,4-tetramethylenediamine, and N,N-diethyl-1,4-tetramethylenediamine; N,N-dialkyl-1,6-hexamethylenediamine such as N,N-dimethyl-1,6-hexamethylenediamine, and N,N-diethyl-1,6-hexamethylenediamine; N-aminoalkylmorpholines such as N-(2-aminoethyl)morpholine, N-(3-aminopropyl) morpholine, N-(4-aminobutyl)morpholine, and N-(6-aminohexyl)morpholine; N-aminoalkylpyrrolidines such as N-(2-aminoethyl)pryrrolidine, and N-(3-aminopropyl) pyrrolidine; and N-aminoalkylpiperidines such as N-(2-aminoethyl)piperidine, and N-(3-aminopropyl)piperidine. The quaternary ammonium-forming agent includes various acids, and icdoalkyl compounds. Specific examples thereof includes inorganic and organic acids such as hydrochloric acid, sulfuric acid, phosphoric acid, acetic acid, and toluenesulfonic acid; and iodoalkyl compounds such as methyl iodide, and ethyl iodide.

Component (I) constitutes 40 to 60 mole % portion, preferably 45 to 55 mole % portion of the entire polymer in the present invention. The polymer comprising Component (I) in an amount of more than 60 mole % is brittle, whereas the polymer comprising Component (I) in an amount of less than 40 mole % has low heat resistance, disadvantageously.

In the embodiment in which the N-alkyl-substituted maleimide/olefin copolymer is constituted of Component (I), Component (II), and Component (III), the content of Component (III) is not specially limited, bur is preferably in the range of from 0.1 to 10 mole %, more preferably from 0.5 to 5 mole %. The content of Component (III) of 0.1 to 10 mole % is preferred since the ionic bonding is formed sufficiently between the polymer and the phyllosilicate to heighten the property improvement effect.

The N-alkyl-substituted maleimide/olefin copolymer in the present invention has a weight-average molecular weight (Mw) ranging preferably from $1\times10^3$ to $5\times10^6$, more preferably from $1\times10^5$ to $1\times10^6$. The weight-average molecular weight herein is determined by gel permeation chromatography (GPC) in terms of polystyrene. The polymaner having a weight-average molecular weight of higher than $5\times10^6$ has exceedingly high melt viscosity to result in low moldability, whereas the polymer having a weight-average molecular weight of lower than $1\times10^3$ is brittle, disadvantageously.

Another constitutional component, phyllosilicate, of the present invention is described below.

The phyllosilicate used in the present invention is constituted of lamination of many layers of magnesium silicate or aluminum silicate of 6 to 16 Å thick. Such a silicate layer is negatively charged by partial isomorphous replacement of magnesium or aluminum by a lower atomic valence element, lithium or magnesium. The area on the surface for one negative charge is preferably in the range of from 25 to 200 (Å)$^2$. In other words, the phyllosilicate has preferably a cation exchange capacity of from 50 to 300 meq/100 g. A phyllosilicate having a cation exchange capacity of less than 50 meq/100 g is not preferred since it gives less ionic bonding to reduce the affinity between the matrix polymer and the phyllosilicate. On the other hand, a phyllosilicate having a cation exchange capacity of more than 300 meq/100 g is not preferred since the bonding strength is extremely high to render the dispersion of the phyllosilicate difficult.

The average dispersion particle diameter of the phyllosilicate is preferably not more than 0.3 μm, more preferably not more than 0.1 μm in order to secure the transparency of the composite material of the present invention. The phyllosilicate particles having average diameter of more than 0.3 μm impair remarkably the transparency of the composite material to make it useless.

The phyllosilicate includes specifically smectic clay minerals such as montmorillonite, saponite, beidellite, hectorite, and stivensite; layered polysilicate such as vermiculite, halosite, swelling mica, apophyllite, margarite, and ganophyllite; crystalline polysilicates which are obtained by exchanging the interlayer cation by proton, and may be of natural origin or may be a stnthetic substance. The aforementioned phyllosilicate may be ground by a grinding machine such as a mixer, a ball mill, a vibration mill, a pin mill, and a jet mill.

The phyllosilicate used in the present invention, which has relatively high affinity for the N-alkyl-substituted maleimide/olefin copolymer, is useful by itself without modification. However, the phyllosilicate may be modified with an organic substance to increase the affinity to the N-alkyl-substituted maleimide/olefin copolymer. This modification by an organic substance can be conducted in such a method described in Japanese Patent Laid-Open Publication 5-194851. In one method, for example, interlayer cation like Na, or Li in the phyllosilicate is ion-exchanged by an organic ammonium salt. In another method, a silanol group on the surface of the phyllosilicate is reacted with an organic halogenated silane.

The phyllosilicate is incorporated into the composite of the present invention at a content ranging from 0.1 to 100 parts by weight to 100 parts by weight of the N-alkyl-substituted maleimide/olefin copolymer. At the content of phyllosilicate of less than 0.1 parts by weight, the amount of the phyllosilicate is insufficient for the strengthening effect, and the improvement of heat resistance and rigidity cannot be achieved sufficiently, undesirably. On the other hand, at the content of phyllosilicate of more than 100 parts by weight, the phyllosilicate is not sufficiently dispersed, and the melt viscosity of the polymer becomes high to affect adversely the moldability, disadvantageously.

The process for producing the composite material of the present invention will be described. The process includes at least three steps of (A), (B), and (C) below:

Step (A) of reacting a copolymer constituted of 40 to 60 mole % of maleic anhydride and 60 to 40 mole % of an olefin with one or more amine compounds to form a polyamidic acid in a solvent for the resulting polyamidic acid to form a homogeneous solution, Step (B) of contacting the above formed homogenous polyamide solution with a suspension of phyllosilicate, and Step (C) of heating the mixture of the polyamidic acid and the phyllosilicate prepared in Step (B) above to cause ring closure of the pollymidic acid to form an imide in the presence of the phyllosilicate, thereby forming a copolymer containing succinimide units of Component (I), or of Component (I) and Component (III) to obtain a composite material containing the phyllosilicate.

In Step (A), a maleic anhydride/olefin copolymer is reacted with an amine compound to form a uniform polyamidic acid solution in a solvent. The maleic anhydride/olefin copolymer employed in the present invention is readily obtained by radical copolymerization of maleic anhydride, an olefin, and another copolymerizable monomer. The useful olefin includes ethylene, isobutene, 2-methyl-1-butene, 2-methyl-1-pentene, 2-methyl-1-hexene, 1-methyl-1-heptene, 1-isooctene, 2-methyl-1-octene, 2-ethyl-1-pentene, 2-methyl-2-butene, 2-methyl-2-pentene, and 2-methyl-2-hexene. Of these, isobutene is preferred in view of the heat resistance and mechanical properties. The olefins may be used singly or in combination of two or more thereof.

Another vinyl monomer may be copolymerized, if necessary, provided that the object of the present invention is achieved. The vinyl monomer includes styrene derivatives such as styrene, α-methylstyrene, and vinyltoluene; dienes such as 1,3-butadiene, and isoprene and halogen-substituted derivatives thereof; methacrylate esters such as methyl methacrylate, ethyl methacrylate, cyclohexyl methacrylate, phenyl methacrylate, and benzyl methacrylate; acrylate esters such as methyl acrylate, ethyl acrylate, butyl acrylate, cyclohexyl acrylate, phenyl acrylate, and benzyl acrylate; vinyl esters such as vinyl acetate, and vinyl benzoate; vinyl ethers such as methyl vinyl ether, ethyl vinyl ether, propyl vinyl ether, and butyl vinyl ether; vinyl chloride, vinylidene chloride, and acrylonitrile. The monomers may be used singly or in combination of two or more thereof.

The process for producing the maleic anhydride/olefin copolymer used in the present invention is not specially limited. Preferably, radical precipitation polymerization is employed in which formed copolymer is separated in a particle state by use of a solvent in which maleic anhydride is soluble and the formed copolymer is insoluble, since the remaining maleic anhydride which causes discoloration can be decreased and the copolymer is obtained in a particle state. The solvent for the precipitation polymerization includes acetate esters such as ethyl acetate, propyl acetate, butyl acetate, and mixed solvent of an acetate ester and an alcohol. A dispersion stabilizer of a cellulose type, a vinyl alcohol type, or the like may be used in the polymerization.

The polymerization initiator for producing the aforementioned maleic anhydride/olefin copolymer includes organic peroxides such as benzoyl peroxide, lauroyl peroxide, octanoyl peroxide, acetyl peroxide, di-t-butyl peroxide, t-butylcumyl peroxide, dicumyl peroxide, t-butyl peroxyacetate, t-butyl peroxybenzoate, and perbutyl neodecanoate; and azo type initiators such as 2,2'-azobis(2,4-dimethylvaleronitrile), 2,2'-azobis(2-butyronitrile), 2,2'-azobisisobutyronitrile, dimethyl 2,2'-azobisisobutylate, and 1,1'-azobis(cyclohexane-1-carbonitrile). The polymerization temperature is selected suitably depending the decomposition temperature of the initiator, and generally in the range of from 40° to 120° C.

The succinic anhydride unit is contained in the maleic anhydride/olefin copolymer in the present invention at a content ranging from 40 to 60 mole % of the entire polymer. The olefin unit is contained at a content ranging from 60 to 40 mole % of the entire polymer. Another copolymerizable monomer unit is contained at a content ranging preferably from 0 to 20 mole %, more preferably from 0 to 5 mole %, still more preferably from 0 to 1 mole %.

Any unreacted remaining maleic anhydride monomer in the maleic anhydride/olefin copolymer causes discoloration on imidation of the copolymer. Therefore, the copolymerization is preferably conducted in the presence of excess olefin, the molar ratio of maleic anhydride to olefin being preferably not higher than one. The remaining maleic anhydride monomer can be removed by washing the formed polymer particles after polymerization with a solvent which dissolves maleic anhydride but does not dissolve the copolymer. The content of the remaining maleic anhydride monomer in the used maleic anhydride/olefin copolymer is preferably less than 1% by weight, more preferably not more than 0.1% by weight.

The maleic anhydride/olefin copolymer employed in the present invention has a relative solution viscosity ranging preferably from 0.1 to 10.0, more preferably from 0.5 to 5.0. Herein, the relative solution viscosity is a ratio of the flow time (t1) of 0.5 g/dL solution of the maleic anhydride/olefin copolymer in N,N-dimethylformamide to the flow time (t0) of N,N-dimethylformamide measured at 23° C. by an Ubbelohde viscometer.

The amine compound which gives the construction component (I) in the production process of the present invention includes primary amines of 1 to 6 carbons such as methylamine, ethylamine, isopropylamine, n-butylamine, s-butylamine, t-butylamine, and cyclohexylamine. The amine may be used singly or in combination of two or more thereof. Of these amines, methylamine, ethylamine, isopropylamine, and cyclohexylamine are preferred since the heat resistance of the produced copolymer is excellent with such amines. Additionally, an aromatic amine such as aniline, 2-methylaniline, 2,6-dimethylaniline, 4-aminobenzoic acid, and may be combinedly used with the above amines. The amount of the aromatic amine combinedly used is in the range of preferably from 0. to 30 mole %, more preferably from 0 to 5 mole % of the alkylamine. Addition of the combined aromatic amine in an amount of larger than 30 mole % is not preferred since addition of the large amount of the aromatic amine will cause deterioration of mechanical properties and optical properties.

The amine compound which gives the construction component (III) in the production process of the present invention includes alkylenediamines such as ethylenediamine, 1,3-propylenediamine, 1,4-tetramethylenediamine, and 1,6-hexamethylenediamine; N,N-dialkylethylenediamines such as N,N-dimethylethylenediamine, N,N-diethylethylenediamine, and N,N-dipropylethylenediamine; N,N-dialkyl-1,3-propylenediamines such as N,N-dimethyl-1,3-propylenediamine, N,N-diethyl-1,3-propylenediamine, and N,N-dipropyl-1,3-propylenediamine; N,N-dialkyl-1,4-tetramethylenediamines such as N,N-dimethyl-1,4-tetramethylenediamine, and N,N-diethyl-1,4-tetramethylenediamine; N,N-dialkyl-1,6-hexamethylenediamines such as N,N-dimethyl-1,6-hexamethylenediamines, and N,N-diethyl-1,6-hexamethylenediamines; N-aminoalkylmorpholines such as N-(2-aminoethyl)morpholine, N-(3-aminopropyl) morpholine, N-(4-aminobutyl)morpholine, and N-(6-aminohexyl)morpholine; N-aminoalklpyrrolidine such as N-(2-aminoethyl)pyrrolidine, and N-(3-aminopropyl) pyrrolidine; and N-aminoalkylpiperidine such as N-(2-aminoethyl)piperidine, and N-(3-aminopropyl)piperidine. Of these amines, preferred are N,N-dialkylethylenediamines and N,N-dialkyl-1,3-propylenediamines.

The amine compound for giving the construction component (I) is used in an amount ranging preferably from 1.0 to 3.0 moles per mole of the maleic anhydride unit, and the amine compound for giving the construction component (III) is added in an amount ranging preferably from 0.002 to 0.4 mole per mole of the maleic anhydride unit of the maleic anhydride/olefin copolymer. A less amount of addition of the amine compounds for giving the construction component (I) than the above lower limits is not preferred, since the maleic anhydride units will remain unreacted to cause of discoloration and insufficient heat stability disadvantageously. A larger amount of addition of the amine compounds for giving the construction component (I) than the above upper limits is not preferred, since the unreacted amine compounds will be adsorbed and remain in the polymer in a large amount.

The solvent for the polyamidic acid synthesis reaction is preferably the one which dissolves the formed polyamidic acid uniformly, and exemplified by water; alcohols such as methanol, ethanol, propanol, and benzyl alcohol; amide type solvents such as N,N-dimethylformamide, and N-methyl-2-pyrrolidone; urea type solvents such as 1,3-dimethyl-2-imidazolidinone; and mixtures thereof. The solvent is used preferably in such an amount to result in a polyamidic acid concentration in the range of from 3% to 50% by weight, more preferably from 5% to 30% by weight. The polyamidic acid concentration of less than 3% by weight is not preferred since much labor is required in the later step for removing the large amount of solvent, whereas the concentration of more than 50% by weight is not preferred since dissolution of the resulting polyamidic acid tends to be insufficient or the viscosity of the system tends to be extremely high to render nonuniform the mixing with the phyllosilicate in the subsequent step.

The reaction temperature of the polyamidic acid synthesis reaction is specially limited, and is usually selected arbitrarily within the range of 0° to 150° C.

Next, Step (B) is described. In Step (B), the uniform solution of the polyamidic acid produced in the preceding Step (A) is brought into contact and mixed with a suspension of phyllosilicate in a solvent to form a homogeneous mixture of the polyamidic acid and the phyllosilicate. The suspension of phyllosilicate in solvent herein means a suspension of phyllosilicate in water when the phyllosilicate is unmodified, or a dispersion of modified phyllosilicate in a solvent which swells and disperses it when the phyllosilicate has been modified by the aforementioned treatment with an organic substance. The solvent is exemplified by toluene, benzene, N,N-dimethylformamide, and alcohols.

The concentration of the phyllosilicate in the liquid dispersion is preferably not higher than 10% by weight, more preferably not higher than 5% by weight since the phyllosilicate is liable to gel. The method of preparation of the liquid suspension is not specially limited, but the phyllosilicate is dispersed under high shear conditions by means of a high-speed mixer or the like to obtain fine dispersion of the phyllosilicate.

The conditions for mixing the polyamidic acid and the phyllosilicate are not limited provided that uniform mixing is achieved. The uniform mixture can be obtained by mixing the polyamidic acid and the phyllosilicate by stirring at a temperature in the range of from 0° to 100° C. for a time of from one minute to 10 hours.

Step (C) is described below. In Step (C), the mixture of the pollymidic acid and the phyllosilicate is heated to cause ring closure and imidation of the polyamidic acid to produce a composite material composed of N-alkyl-substituted maleimide/olefin copolymer and phyllosilicate.

The heating and imidation can be conducted in various methods. In one method, the mixture prepared in Step (B) is heated in the presence or absence of a solvent at a temperature of from 100° C. to 400° C. to allow imidation reaction to proceed, with evaporation of the solvent if it is present. In another method, the imidation is allowed to proceed by heating at a temperature of from 100° to 400° C. in the presence of a solvent in a closed system as disclosed in Japanese Patent Laid-Open Publication 6-248018. In still another method, the solvent is replaced by an aromatic alcohol, n-decane, or the like, and imidation is allowed to proceed by heating at atmospheric pressure. In any imidation method, a basic or acidic catalyst such as triethylamine, and toluenesulfonic acid may be added as the reaction catalyst.

The degree of imidation depends on the reaction temperature, the reaction time, and so forth. In order to achieve sufficient heat resistance, the succinic anhydride units incorporated in the copolymer should be converted to succinimide units in an imidation degree of preferably not less than 80 mole %, more preferably not less than 95 mole %, still more preferably not less than 99 mole %. The copolymer of imidation degree of less than 80 mole % is liable to be less heat-stable.

The composite material of the present invention may further contain a heat-stabilizer, a UV absorber, a lubricant, a dye, an antistatic agent, a plastic material, an elastomer, or the like.

The composite material of the present invention is superior in color tone, and transparency, and has significantly improved heat resistance and rigidity. Therefore, this composite material is useful as optical parts, automobile parts, electric or electronic parts, medical packaging material, foodstuff packaging material, and so forth in various application fields. Further, even when blended with another plastic or elastomer material, this composite gives a product having excellent color tone.

The present invention is described below in more detail by reference to examples without limiting the invention thereto.

SYNTHESIS EXAMPLE 1

(Synthesis of maleic anhydride/isobutene copolymer)

Into a 30-liter autoclave equipped with a stirrer, a nitrogen-introducing tube, an isobutene-introducing tube, a thermometer, and a gas outlet tube, were charged 2.8 kg of maleic anhydride, 10 g of lauryl mercaptan, 6.3 g of t-butyl peroxypivalate, and 19 L of isopropyl acetate. The interior of the autoclave was purged several times with nitrogen, and thereto 5.2 L of liquified isobutene was charged. The reaction is allowed to proceed at 60° C. for 6 hours.

The formed particulate matter was collected by centrifugation and dried to obtain 4.4 kg of realistic anhydride/isobutene copolymer. The resulting copolymer contained 50 mole % of succinic anhydride units according to elemental analysis, and had relative solution viscosity of 2.0 (measured in N,N-dimethylformamide solvent at 23° C. with an Ubbelohde viscometer).

EXAMPLE 1

Into a 10-liter autoclave equipped with a stirrer, a nitrogen-introducing tube, and a thermometer, were charged 950 g of the copolymer prepared in Synthesis Example 1, and 5 L of methanol. The interior of the autoclave was purged with nitrogen. Into the autoclave, is added 605 g of 40% methylamine solution in methanol. The reaction was allowed to proceed with stirring at room temperature for 5 hours to obtain a solution of a polyamidic acid in methanol.

Separately, 50 g of montmorillonite (Kunipia F, Kunimine Kogyo K.K.) was dispersed in 4 L of water, and the dispersion was agitated with a high-speed mixer at 11000 rpm for 10 minutes to obtain a liquid suspension. This montmorillonite suspension in water was added gradually to the above solution of polyamidic acid in methanol. The mixture was stirred at room temperature for one hour to obtain a uniform liquid mixture. Then the obtained mixture was discharged from the autoclave, and the water and the methanol were removed by evaporator at 80° C. under a reduced pressure to obtain a uniform mixture of polyamidic acid and montmorillonite.

This mixture was pulverized by a pulverizer. To 100 parts by weight of the mixture, were added 0.1 part by weight of tris(2,4-di-t-butylphenyl) phosphite, and 0.05 part by weight of pentaerythrityl tetrakis[3-(3,5-di-t-butyl-4-hydroxyphenyl)propionate]. The mixture was extruded continuously under nitrogen atmosphere by means of a twin screw extruder set at temperatures of 150° C., 260° C., 280° C., and 270° C. in the direction of from the bottom of the hopper to the tip nozzle while the water formed by the reaction and the excess amine were removed from the vent to prepare a strand. The strand was cut into pellets.

The pellets were press-molded into a test piece of 1 mm thick. The press-molded test piece was observed for the dispersion state of montmorillonite with a transmission electron microscope, and the average size thereof was calculated. The same test piece was subjected to measurements of the total light transmittance, and the haze with a haze meter according to ASTM D1003. Separately, the pellets were injection-molded into another test piece with a midget injection machine at a cylinder temperature of 300° C. and at a metal mold temperature of 120° C. The injection-molded test piece was tested for flexural strength and flexural modulus according to ASTM D790, linear expansion coefficient (perpendicular to the flow direction) according to ASTM D696, and heat deflection temperature under load (with a load of 18.6 kg) according to ASTM D648. The mold shrinkage factor (perpendicular to the flow direction) was calculated from the dimensions of the metal mold for the injection molding and the injection-molded test piece.

The results are summarized in Tables 1 and 2. The composite material of this Example was transparent, and had a remarkably high flexural strength, and an improved deflection temperature under load. Further, this composite material had a small mold shrinkage factor, a small linear expansion coefficient, and high dimension stability, thereby being suitable for precision molding.

EXAMPLE 2

Into a 10-liter autoclave equipped with a stirrer, a nitrogen-introducing tube, and a thermometer, were charged 950 g of the copolymer prepared in Synthesis Example 1, and 5 L of methanol. The interior of the autoclave was purged with nitrogen. 6.1 Grams of N,N-dimethyl-1,3-propanediamine was added into the autoclave, and was allowed to react with the copolymer at room temperature for 3 hours. Thereto, was added 605 g of 40% methylamine solution in methanol, and the reaction was allowed to proceed with stirring at room temperature for 5 hours. Further, 6.3 g of aqueous 35% hydrochloric acid solution was added to obtain a solution in methanol of a polyamidic acid having a cationic functional group in 0.5 mole % of the entire polymer.

Separately, 50 g of montmorillonite (Kunipia F, Kunimine Kogyo K.K.) was dispersed in 4 L of water, and the dispersion was agitated with a high-speed mixer at 11000 rpm for 10 minutes to obtain a liquid suspension. This montmorillonite suspension in water was added gradually to the above solution of polyamidic acid in methanol. The mixture was stirred at room temperature for one hour to obtain a uniform liquid mixture. Then the obtained mixture was discharged from the autoclave, and the water and the methanol were removed by evaporator at 80° C. under a reduced pressure to obtain a uniform mixture of polyamidic acid and montmorillonite.

This mixture was pulverized by a pulverizer. To 100 parts by weight of the mixture, were added 0.1 part by weight of tris(2,4-di-t-butylphenyl) phosphite, and 0.05 part by weight of pentaerythrityl tetrakis[3-(3,5-di-t-butyl-4-hydroxyphenyl)propionate]. The mixture was extruded continuously under nitrogen atmosphere by means of a twin screw extruder set at temperatures of 150°C., 260° C., 280° C., and 270° C. in the direction of from the bottom or the hopper to the tip nozzle while the water formed by the reaction and the excess amine were removed from the vent to prepare a strand. The strand was cut into pellets.

The obtained pellets was formed into test pieces, and was evaluated for dispersion state of montmorillonite, and resin properties in the same manner as in Example 1. The results are summarized in Tables 1 and 2.

EXAMPLES 3 TO 6

Composite materials were prepared in the same manner as in Example 2 except that the content or the kind of the phyllosilicate are changed as shown in Table 1. The resulting composite materials were evaluated in the same manner as in Example 1. The results are summarized in Tables 1 and 2.

COMPARATIVE EXAMPLE 1

An N-methylmaleimide/isobutene copolymer was prepared in the same manner as in Example 1 except that montmorillonite suspension in water was not added. The copolymer was evaluated in the same manner as in Example 1. The results are summarized in Tables 1 and 2. The N-methylmaleimide/isobutene copolymer without montmorillonite had low flexural strength, low flexural modulus, poor heat resistance, and poor dimensional stability in comparison with the composite material obtained in Example 1.

COMPARATIVE EXAMPLE 2

A cation-modified N-methylmaleimide/isobutene copolymer was prepared in the same manner as in Example 2 except that montmorillonite suspension in water was not added. The copolymer was evaluated in the same manner as in Example 2. The results are summarized in Tables 1 and 2. The cation-modified N-methylmeimide/isobutene copolymer without montmorillonite had low flexural strength, low flexural modulus, poor heat resistance, and poor dimensional stability in comparison with the composite material obtained in Example 2.

COMPARATIVE EXAMPLE 3

A composite material was prepared in the same manner as in Example 2 except that the montmorillonite was replaced by swelling mica (ME-100, Co-op Chemical CO. LTD). The resulting composite material was evaluated in the same manner as in Example 2. The results are shown in Tables 1 and 2. The larger avenge particle diameter of the phyllosilicate impaired the optical properties of the composite material to lower the transparency thereof.

COMPARATIVE EXAMPLE 4

A cation-modified N-methylmaleimide/isobutene copolymer was prepared in the same manner as in Example 2 except that montmorillonite suspension in water was not added. The obtained copolymer pellets was dry-blended with powdery montmorillonite in the blending ratio shown in Table 1. The resulting dry-blend was extruded by a twin screw extruder in the same manner as in Example 1 to produce a compound comprising N-methylmaleimide/ isobutene copolymer and montmorillonite. The resulting compound is evaluated in the same manner as in Example 1. The results are shown in Tables 1 and 2. Simple blending of the maleimide copolymer and montmorillonite results in coarse dispersion of the montmorillonite to give poor optical properties, and the mechanical and thermal properties of the molded matter were poor in comparison with those of the Examples.

As described above, the N-alkyl-substituted maleimide/ olefin copolymer composite material of the present invention has excellent transparency, and yet is superior in rigidity, heat resistance, and dimensional stability. Therefore, the composite material of the present invention is useful in various applications not only to optical parts but also to automobiles, electric parts, electronic parts, and so forth.

TABLE 1

| | Cationic functional group in maleimide copolymer (mole %) | Phyllosilicate Kind | Content (weight %) | Average particle diameter in composite (μm) | Total light transmittance (%) | Haze (%) | Flexural strength (kg/cm$^2$) | Flexural modulus (kg/cm$^2$) |
|---|---|---|---|---|---|---|---|---|
| Example | | | | | | | | |
| 1 | 0 | Montmorillonite | 3.9 | 0.1 | 76 | 5.9 | 1060 | 62000 |
| 2 | 0.5 | Montmorillonite | 3.9 | 0.1 | 78 | 5.6 | 1090 | 66000 |
| 3 | 0.5 | Montmorillonite | 2.3 | 0.1 | 82 | 4.2 | 1090 | 58000 |
| 4 | 0.5 | Montmorillonite | 0.8 | 0.1 | 84 | 3.4 | 1000 | 54000 |

TABLE 1-continued

| | Cationic functional group in maleimide copolymer (mole %) | Phyllosilicate Kind | Phyllosilicate Content (weight %) | Average particle diameter in composite (μm) | Optical properties of composite Total light transmittance (%) | Haze (%) | Mechanical properties of composite Flexural strength (kg/cm²) | Flexural modulus (kg/cm²) |
|---|---|---|---|---|---|---|---|---|
| 5 | 0.5 | Hectorite | 3.9 | 0.05 | 88 | 2.7 | 930 | 53000 |
| 6 | 0.5 | Hectorite | 2.3 | 0.05 | 89 | 2.5 | 860 | 51000 |
| Comparative Example 1 | | | | | | | | |
| 1 | 0 | — | — | — | 91 | 1.4 | 1320 | 48000 |
| 2 | 0.5 | — | — | — | 91 | 1.5 | 1080 | 49000 |
| 3 | 0.5 | Swelling mica | 3.9 | 3.0 | 64 | 60.9 | 730 | 52000 |
| 4 | 0.5 | Montmorillonite | 3.9 | 8.8 | 55 | 60.0 | 990 | 48000 |

TABLE 2

| | Cationic functional group in maleimide copolymer (mole %) | Phyllosilicate Kind | Phyllosilicate Content (weight %) | Average particle diameter in composite (μm) | Thermal properties of composite Heat deflection temperature under load (°C.) | Mold shrinkage factor (%) | Linear expansion coefficient (× 10⁻⁵ cm/cm - °C.) |
|---|---|---|---|---|---|---|---|
| Example | | | | | | | |
| 1 | 0 | Montmorillonite | 3.9 | 0.1 | 147 | 0.16 | 4.1 |
| 2 | 0.5 | Montmorillonite | 3.9 | 0.1 | 149 | 0.16 | 4.1 |
| 3 | 0.5 | Montmorillonite | 2.3 | 0.1 | 146 | 0.16 | 4.3 |
| 4 | 0.5 | Montmorillonite | 0.8 | 0.1 | 144 | 0.32 | 4.3 |
| 5 | 0.5 | Hectorite | 3.9 | 0.05 | 143 | 0.24 | 4.9 |
| 6 | 0.5 | Hectorite | 2.3 | 0.05 | 142 | 0.32 | 4.9 |
| Comparative Example 1 | | | | | | | |
| 1 | 0 | — | — | — | 137 | 0.36 | 5.2 |
| 2 | 0.5 | — | — | — | 138 | 0.36 | 5.2 |
| 3 | 0.5 | Swelling mica | 3.9 | 3.0 | 143 | 0.22. | 4.1 |
| 4 | 0.5 | Montmorillonite | 3.9 | 8.8 | 139 | 0.34 | 5.1 |

What is claimed is:

1. A transparent N-alkyl-substituted maleimide/olefin copolymer composite material, comprising 100 parts by weight of an N-alkyl-substituted maleimide/olefin copolymer, and 0.1 to 100 parts by weight of phyllosilicate, said N-alkyl-substituted maleimide/olefin copolymer comprising a first component (I) constituting from 40 to 60 mole % of the copolymer:

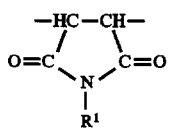

where $R^1$ is an alkyl group of 1 to 18 carbons or a cycloalkyl group of 3 to 12 carbons;

and a second component (II) constituting from 60 to 40 mole % of the copolymer:

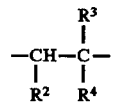

where $R^2$ is hydrogen or an alkyl group of 1 to 8 carbons, and $R^3$ and $R^4$ are independently an alkyl group of 1 to 8 carbons; the copolymer having a weight-average molecular weight ranging from $1\times10^3$ to $5\times10^6$; and said phyllosilicate being dispersed uniformly and finely in a matrix of the N-alkyl-substituted maleimide/olefin copolymer.

2. A transparent N-alkyl-substituted maleimide/olefin copolymer composite material, comprising 100 parts by weight of an N-alkyl-substituted maleimide/olefin copolymer, and 0.1 to 100 parts by weight of phyllosilicate, said N-alkyl-substituted maleimide/olefin copolymer comprising a first component (I) constituting from 40 to 60 mole % of the copolymer:

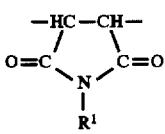

(I)

where $R^1$ is an alkyl group of 1 to 18 carbons or a cycloalkyl group of 3 to 12 carbons;

a second component (II) constituting from 60 to 40 mole % of the copolymer:

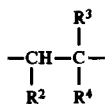

(II)

where $R^2$ is hydrogen or an alkyl group of 1 to 8 carbons, and $R^3$ and $R^4$ are independently an alkyl group of 1 to 8 carbons; and a third component (III):

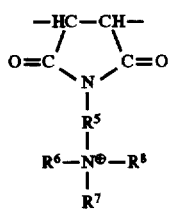

(III)

where $R^5$ is an alkylene group of 1 to 18 carbons, and $R^6$, $R^7$, and $R^8$ are independently hydrogen, or an alkyl group of 1 to 8 carbons;

the copolymer having a weight-average molecular weight ranging from $1 \times 10^3$ to $5 \times 10^6$;

said phyllosilicate being dispersed uniformly and finely in a matrix of the N-alykyl-substituted maleimide/olefin copolymer.

3. A process for producing the transparent N-alkyl-substituted maleimide/olefin copolymer composite material of claim 1, comprising at least steps of (A), (B), and (C):

(A) a step of reacting a copolymer constituted of 40 to 60 mole % of maleic anhydride and 60 to 40 mole % of an olefin with one of more amine compounds to form a polyamidic acid in a solvent for the resulting polymidic acid to form a homogeneous solution, (B) a step of contacting the formed homogenous polyamide solution with a suspension of phyllosilicate, and (C) a step of heating the mixture of the polyamidic acid and the phyllosilicate prepared in Step (B) above to cause ring closure of the polyamidic acid to form an imide in the presence of the phyllosilicate, thereby forming a copolymer containing succinimide units of Component (I), or of Component (I) and Component (III) to obtain a composite material containing the phyllosilicate.

4. A process for producing the transparent N-alkyl-substituted maleimide/olefin copolymer composite material of claim 2, comprising at least steps of (A), (B), and (C):

(A) a step of reacting a copolymer constituted of 40 to 60 mole % of maleic anhydride and 60 to 40 mole % of an olefin with one or more amine compounds to form a polyamidic acid in a solvent for the resulting polyamidic acid to form a homogeneous solution, (B) a step of contacting the formed homogenous polyamide solution with a suspension of phyllosilicate, and (C) a step of heating the mixture of the polyamidic acid and the phyllosilicate prepared in Step (B) above to cause ring closure of the polyamidic acid to form an imide in the presence of the phyllosilicate, thereby forming a copolymer containing succinimide units of Component (I), or of Component (I) and Component (III) to obtain a composite material containing the phyllosilicate.

* * * * *